United States Patent

Su et al.

[11] Patent Number: 5,946,415
[45] Date of Patent: Aug. 31, 1999

[54] METHOD AND APPARATUS TO PROCESS DRAWING IMAGES

[75] Inventors: Wei Su, Staten Island, N.Y.; Gerald T. Michael, Ocean, N.J.

[73] Assignee: The United States of America as represented by the Secretary of the Army, Washington, D.C.

[21] Appl. No.: 08/738,502

[22] Filed: Oct. 24, 1996

[51] Int. Cl.[6] .................................................. G06K 9/46
[52] U.S. Cl. .......................... 382/190; 382/159; 382/181; 382/187; 382/190; 382/209; 382/217; 382/218; 382/221; 382/222; 348/241; 348/246; 348/248
[58] Field of Search ................................... 382/222, 221, 382/218, 217, 209, 181, 187, 190, 159, 162; 348/241, 246, 248

[56] References Cited

U.S. PATENT DOCUMENTS

| | | | |
|---|---|---|---|
| 3,609,686 | 9/1971 | Savory et al. | 340/146.3 T |
| 4,541,114 | 9/1985 | Rutenbar et al. | 382/8 |
| 4,773,099 | 9/1988 | Bokser | 382/14 |
| 4,949,388 | 8/1990 | Bhaskaran | 362/10 |
| 5,572,437 | 11/1996 | Rostoker et al. | 364/489 |
| 5,751,850 | 5/1998 | Rindtorff | 382/178 |

*Primary Examiner*—Leo H. Boudreau
*Assistant Examiner*—Kanji Patel
*Attorney, Agent, or Firm*—Michael Zelenka; George B. Tereschuk

[57] ABSTRACT

The processing time and memory in converting scanned images to a hardware description language is significantly reducer by using a "peephole" method to examine only partial images of features of the scanned image that is to be converted. The present method generated minimized feature templates (MFTs) by systematically removing all non-feature image pixels. In particular, the method and apparatus of the present invention establishes pattern estimates from image samples, eliminates unnecessary image pixels using off-line statistical analysis, and extracts feature templates from the larger size image patterns. Pattern recognition is then conducted by processing a few pixels of the unknown image pattern. An application of this technique is to recognize drawing symbols, such as, AND, NAND, OR, NOR, XOR, and XNOR gates, buffers, inverters, registers, and I/O pins from scanned images of electronic drawings.

20 Claims, 9 Drawing Sheets

CONTOURS OF INVERTER

FIG. 2B

CONTOURS OF AND GATE

FIG. 2C

CONTOURS OF NAND GATE

FIG. 2D

CONTOURS OF NOR GATE

FIG. 2E

CONTOURS OF XNOR GATE

FIG. 3

FEATURE PATTERN OF XNOR GATE

FIG. 4

SUBMINIZED FEATURE PATTERN
OF XNOR GATE

FIG. 5

REDUCING DATA STREAM

Fig. 6

METHOD AND APPARATUS TO PROCESS DRAWING IMAGES

GOVERNMENTAL INTEREST

The invention described herein may be made, used, sold, imported, and/or licensed by, on behalf of, the Government of the United States of America without the payment of any royalties to us.

RELATED APPLICATION

The present application is related to U.S. patent application Ser. No. 08/506943, filed Jul. 20, 1995, entitled "Method for Generating Computer Aided Design Programming Circuit Designs from Scanned Images of the Design."

FIELD OF THE INVENTION

The present invention relates to the field of processing drawing images into computer aided design tools and, more particularly, to a the field of processing images of electronic circuitry into a useable and testable computer aided design tool.

BACKGROUND OF THE INVENTION

Many commercial and military organizations have a plethora of paper-based drawings of electronic systems; in particular, the United States Department of Defense has literally millions of these drawings. In order to stimulate and test, or redesign a system or circuit, the information provided by the drawings must be manually extracted, interpreted, and entered to computer aided design tools. This process is incredibly time consuming and costly.

As disclosed in the Related Application, the inventors have previously designed a method of converting scanned paper drawings on electronic systems into different types hardware description languages by recognizing drawing symbols with a template matching method. However, this method requires a great deal of information to process and therefore, there exists a need in this art to reduce the amount of processing necessary to convert the scanned image into a hardware description language. The present invention fulfills this need.

SUMMARY OF THE INVENTION

Accordingly, one object of the present invention is to reduce the amount of processing of image pixels to convert an image into a useable hardware description language.

Another object of the present invention is to provide such a method which has the ability to detect the features of many different patterns.

Still another object of the present invention is to establish pattern estimates from image samples of the scanned image, eliminate unnecessary image pixels by using off-line large size image patterns.

These and other objects of the invention are accomplished by using a "peephole" method to examine only partial images of features of the scanned image that are to be converted into a useable hardware description language. The present method generates minimized feature templates (MFTs) by systematically removing all non-feature image pixels. In particular, the method and apparatus of the present invention establishes pattern estimates from image samples, eliminates unnecessary image pixels to determine a plurality of dominant pixels, using off-line statistical analysis, and extracts feature templates from the larger size image patterns. Pattern recognition is then conducted by processing a few dominant pixels of the unknown image pattern. An application of this technique is to recognize drawing symbols, such as, AND, NAND, OR, NOR, XOR, and XNOR gates, buffers, invertors, registors, and I/O pins from scanned images of electronic drawings.

BRIEF DESCRIPTION OF THE DRAWINGS

These and other features of the invention will become readily apparent in light of the following Detailed Description of the Invention and the attached drawings wherein.

DETAILED DESCRIPTION OF THE PRESENT INVENTION

The present invention is a method and apparatus to reduce the amount of image pixels that need to be processed in image-to-hardware description language systems such as that described in Related U.S. patent application Ser. No. 08/506,943, filed Jul. 20, 1995, entitled "Method for Generating Computer Aided Design Programming Circuit Designs from Scanned Images of the Design,"which is incorporated herein by reference.

To reduce the amount of processing in these systems, the present invention establishes pattern estimates from image samples of the scanned drawing, eliminates all unnecessary pixels from these pattern estimates in order to determine a group of dominant pixels, establishes a minimized feature template from the pattern estimates which only have the group of dominant pixels after the unnecessary pixels are eliminated, identifies all the unknown patterns, and then uses drawing symbol image recognition to identify the particular symbol of the scanned image. Each of these steps are charted in the flow diagram of FIG. 6 and each of these steps will be discussed in detail.

Pattern Estimates

First particular patterns must be identified in the scanned image. To do this, pattern samples are collected, identified and designated as some N number of patterns, $v_1, v_2, \ldots, v_n$. Then, the patterns are reshaped to the same size or size group. Once this is done, for each pattern, nominally $v_j$, where $j \in P$ and $P=\{1,2, \ldots N\}$, there will be $\eta_j$ samples, or $v_j(1), v_j(2), \ldots v_j(\eta_j)$. These pixels of a particular pattern, nominally $v_j(k)$, where $k=1,2, \ldots \eta_j$, can then be identified as '0's or '1's. In other words, for each pattern $v_j$, there is a frequency of a pixel being a '1' after $\eta_j$ samplings of $v_j$. This probability or frequency can be described in a first expression as:

$$p_j = \left(\sum_{k=1}^{\eta_j} v_j(k)\right) / \eta_j.$$

The entry of $p_j$ indicates the frequency of a pixel being a '1' after $\eta_j$ samplings of $v_j$. Therefore, as $\eta_j$ becomes large, $p_j$ tends to the probability of a pixel value being '1'.

For example let $\hat{v}_j$ be an estimate of pattern $v_j$. Since a pixel with high probability (near 1) is most likely a '1' and a pixel wit low probability (near 0) is most likely a '0', then in a second expression:

$$\hat{v}_{ij} = \begin{cases} 0 & 0 < p_{ij} < \varepsilon \\ 1 & \text{if } 1-\varepsilon < p_{ij} < 1 \\ x & \text{elsewhere} \end{cases}$$

where $\hat{v}_{ij}$ and $p_{ij}$ are the i-th pixel of $\hat{v}_j$ and $p_j$, respectively, 'x' is a large integer such that x+N≈x, i∈S, S={1,2, ..., M}, and M is the total number of pixels in one instance of $\hat{v}_j$. Therefore, from this probability a noise to signal ratio $\lambda_j$, which is equal to the number of 'x's in $\hat{v}_j$ divided by the number of '1's in $\hat{v}_j$, can be calculated. If this signal to noise ratio is small, then the estimation of $v_j$ will be quite reliable. Thus, one will know from the signal to noise ratio whether the pattern estimates generated for all patterns in the scanned image will be reliable. Once the pattern estimates are done the unnecessary pixels are eliminated.

Elimination of Unnecessary Pixels

Using conventional techniques for matching the estimated pattern templates to known images can be used at this point; however, the data processing will take a great deal of time and memory due to the massive data size. For example, a standard E-sized (34×44 inches) drawing scanned at 200 dots-per-inch (dpi) yields an image of 59,840,000 pixels. The present invention eliminates these unnecessary pixels to extract a group of dominant pixels by first defining the pixels to be eliminated with a third expression:

$$b = \left(\sum_{j=1}^{N} v_j\right) / N$$

where the i-th entry of b, denoted by $b_i$, i∈S, has four possible values: 1) $b_i=0$, 2) $b_i=1$, 3) $0<b_i<1$, and 4) $b_i=(\alpha/N)x$, where a α∈P. The first and second cases (1) and 2)) indicate that the i-th pixels of $\hat{v}_1, \hat{v}_2, \ldots, \hat{v}_N$ do not play any role in separating patterns. The fourth case shows the noise level (number of 'x's) of the i-th pixel. Accordingly, assuming in a fourth expression, that:

$$i \in \begin{cases} U & b_i = 0, 1 \\ W & b_i \geq \frac{\beta}{N}x \end{cases}$$

where β∈P, the set U∪W ⊂ S will contain non-feature entries which can be easily eliminated from the set S, so that the group of dominant pixels can be readily extracted.

For example, assuming the following:
$\hat{v}_1$=[0 0 0x1 0 1 1 0 0 1 1 1x0]
$\hat{v}_2$=[0 0 0 0 1x0 1 1 1 1 1 1 0 0 1 0]
$\hat{v}_3$=[0 0x0 1 0 1 0 1 0 1 1 0 0 1 0],
then U={1,2,9,12,16} and W={3 5, 15}. Therefore, if β=1 and the entries indexed by sets U and W are removed from $v_1, v_2, v_3$, the following feature templates are obtained:
$f_1$=[0 1 0 1 0 0 1 1]
$f_2$=[1 0 1 1 1 1 0 0]
$f_3$=[0 0 1 0 0 1 0 0]
where $f_j$, j∈P, is a particular feature template of pattern $v_j$. In using $f_j$, the total number of pixels is significantly reduced leaving only the group of dominant pixels to be extracted and the next step of the process, i.e. establishing minimized feature template, is possible.

Minimized Feature Template

In order to determine the minimized feature template, the feature templates, $f_j$, need to be defined by vectors in a particular dimension space. This can be done by letting $\overline{U \cup W}$={1,2, ..., L}, where L is the total number of pixels in one instance of $f_j$. The distance between $f_j$ and $f_\zeta$, where j≠ζ, is $d_{j\zeta}=\|f_j-f_\zeta\|^2$, and the minimum distance between each of the patterns is denoted by $d_{min}$=min{$d_{j\zeta}$}, j, ζ∈$\overline{U \cup W}$. The objective of minimizing the feature templates is to delete a maximum amount of space from $f_1, f_2, \ldots, f_N$ provided that $d_{min} \geq d_L$, where $d_L$ is the lowest acceptable distance between any two patterns. In other words, the objective is to remove as many entries as possible from $f_1, f_2, \ldots, f_N$ unless the minimum distance requirement is violated. The indices of removed entries are recorded in set R. In the example given, the minimum distance between $f_1, f_2, f_3$ is 3. Thus, choosing $d_{min}$=3 yields the following:
$y_1$=[0 0 1 0 1]
$y_2$=[1 1 1 1 0]
$y_3$=[0 1 0 0 0]
which has the same minimum distance as $f_j$, but occupies a smaller vector space, where the removed entries are R={6, 11,14}.

In summary, the minimized feature template step of the present invention yields the minimized feature templates, $y_1$, $y_2, \ldots, y_N$ together with the set I=$\overline{U \cup W \cup R}$. $Y_j$, j∈P, is a subset of the image pattern estimate $v_j$, but with a much smaller data size, and 'I' is a set of these indices. It should be noted that this minimized feature template step can be performed off-line during step-up and the pattern recognition can be implemented on-line by using the results of this step which can be stored in a database. In the example set forth above, then, I={4,7,8,10,13} and the 5-dimensional minimized feature templates $y_1$, $y_2$ and $y_3$ are obtained by extracting the five entries from the 16-dimensional estimates $\hat{v}_1, \hat{v}_2$, and $\hat{v}_3$. After the minimized feature templates are established then the unidentified patterns need to be identified.

Identification of Unknown Patterns

After the database of the minimized feature templates is created, identification of unknown patterns is simply accomplished by matching the unidentified pattern with precalculated simplified templates. To accomplish this, the unidentified pattern, z, of a high dimension pattern is mapped to a low dimensional vector φ, which is based on the indices in set I. Then, z is identified by finding the best match of φ with the minimized feature templates $y_1, y_2, \ldots, y_N$, that is:

$$\min\{\phi-y_j;\ (1 \leq j \leq N)\}.$$

Figure 5:
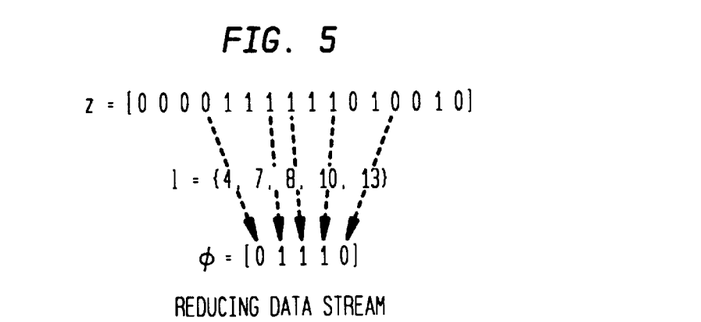
FIG. 5 is a diagram of mapping a 16 bit vector to a 5 bit vector according to the present invention.

In the example given above, assume that z=[0000111111010010], therefore, this 16-bit vector z can be mapped to a 5-bit vector φ, as shown in FIG. 5. As shown in FIG. 5, the various bits of z are mapped by set I (as calculated from the previous step) to yield 5-bit vector φ. Thus, since the best matched template is $y_2$, z→$y_2$→$v_2$, z is easily identified to be $v_2$.

Complete Process

Figure 1:
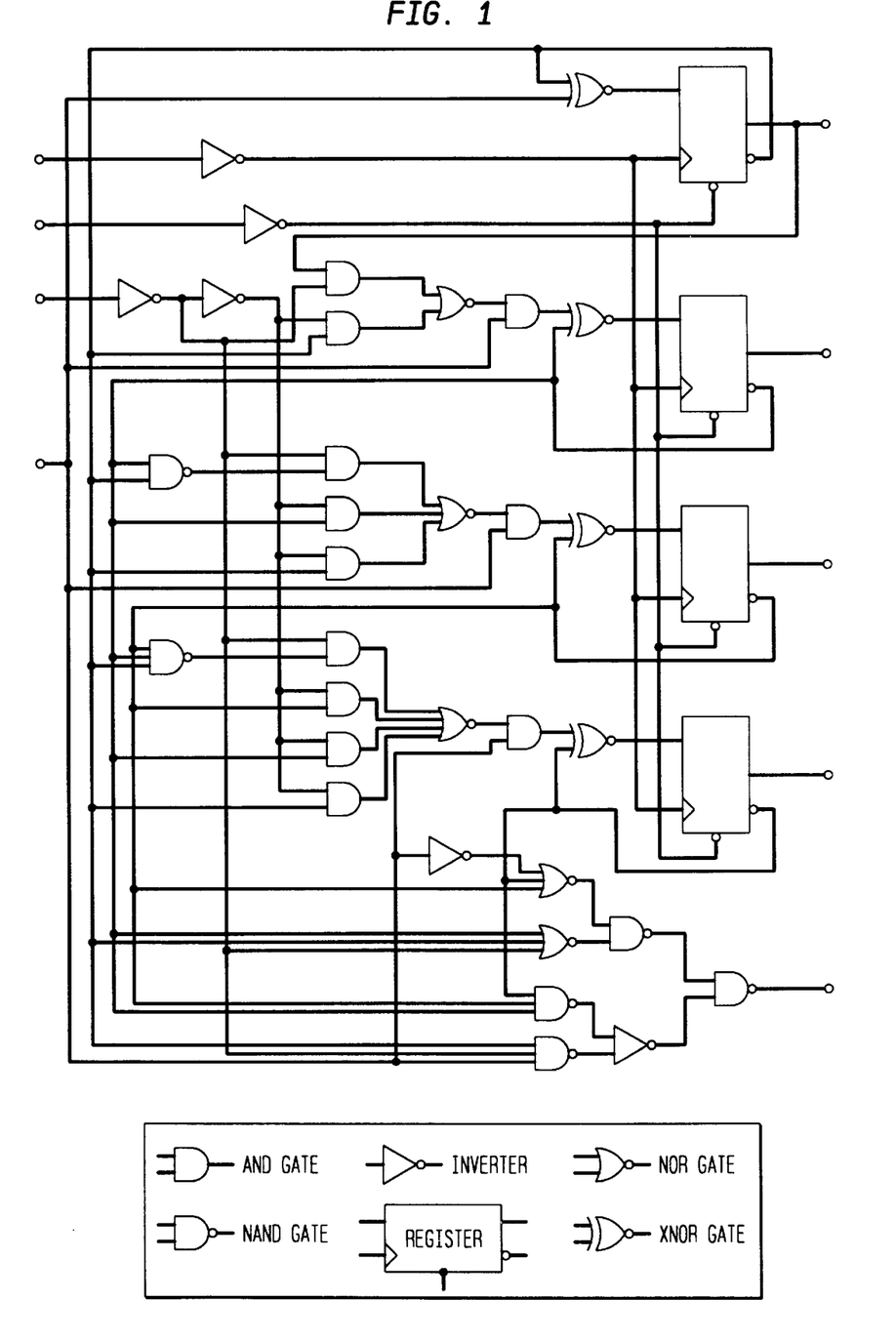
FIG. 1 is an example of circuit which may be processed by the present invention.
Figure 2A:
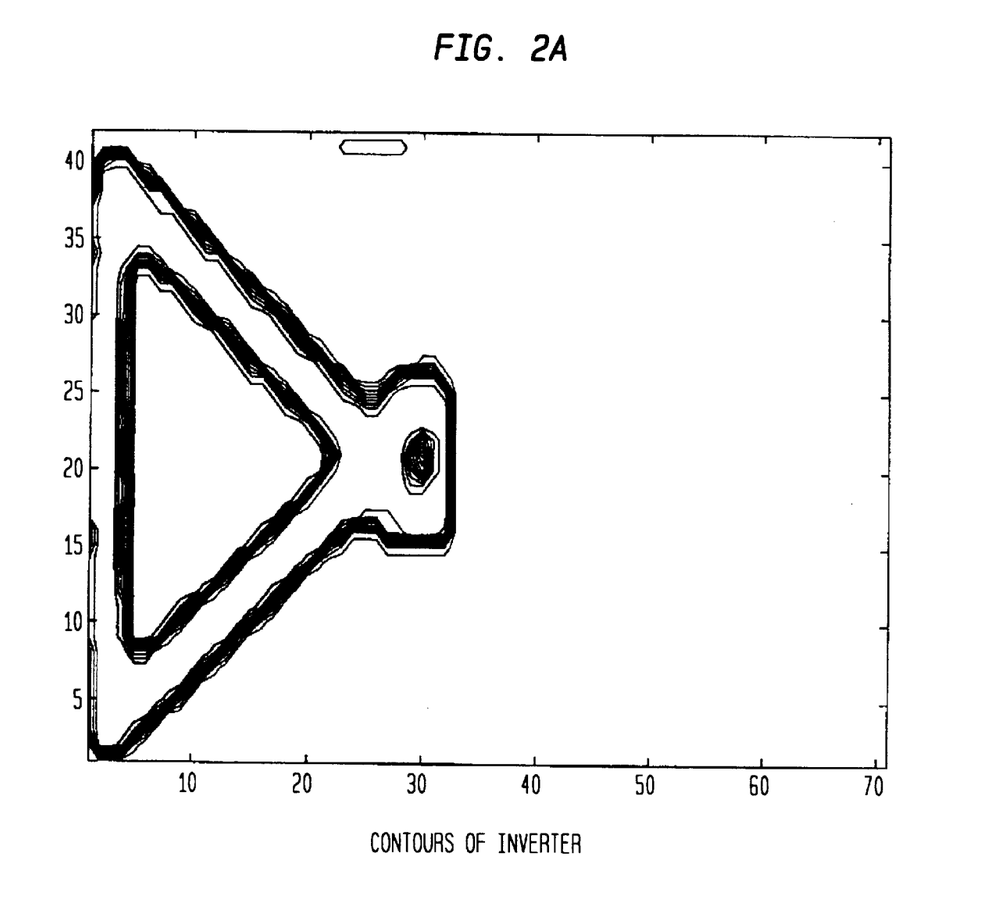
FIGS. 2a–e are examples of probability contours of various symbols that are found in the circuit of FIG. 1.
Figure 2B:
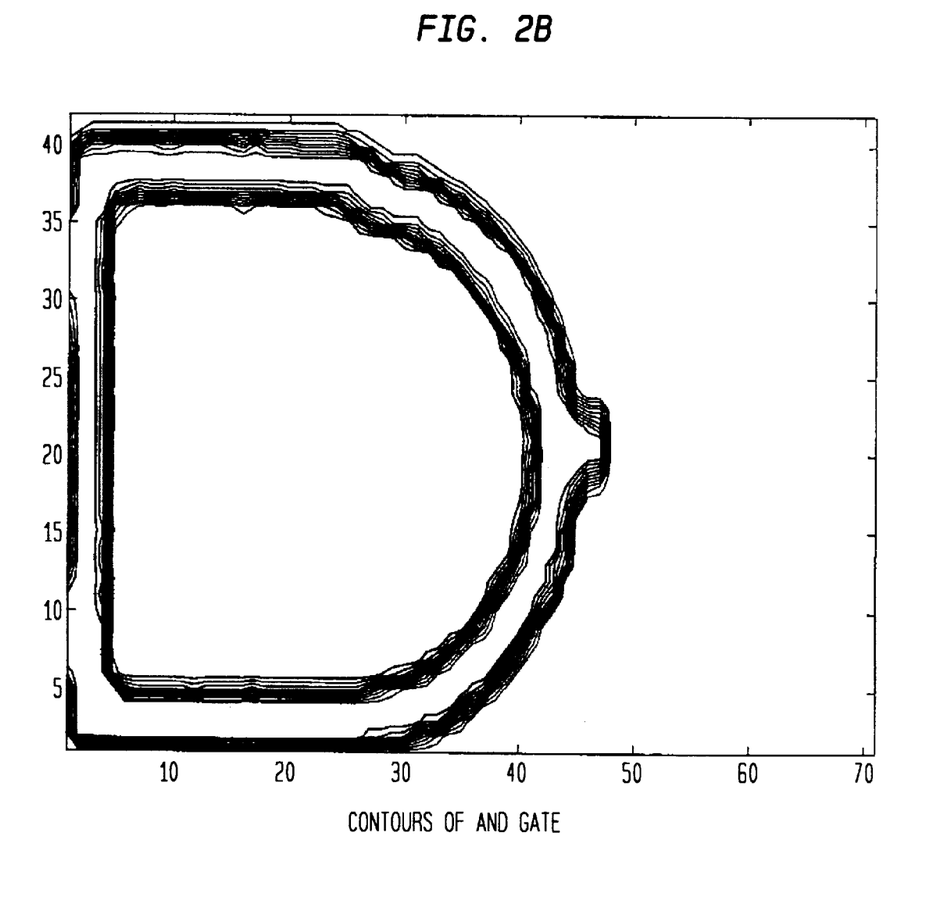
Figure 2C:
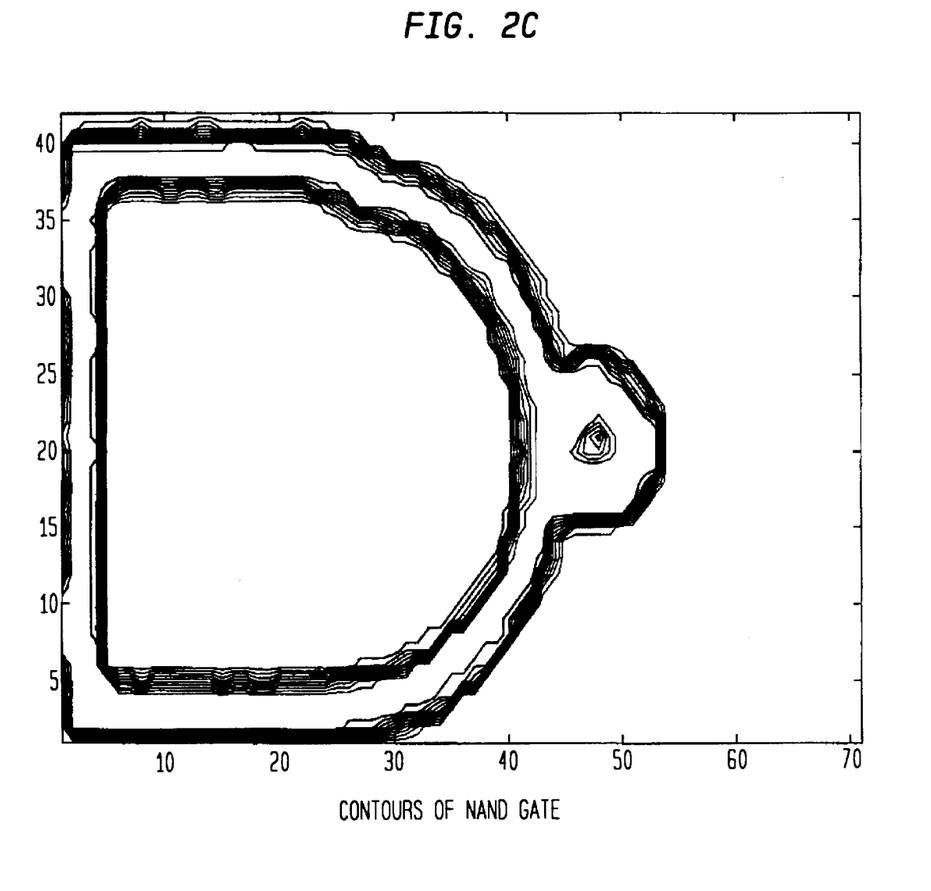
Figure 2D:
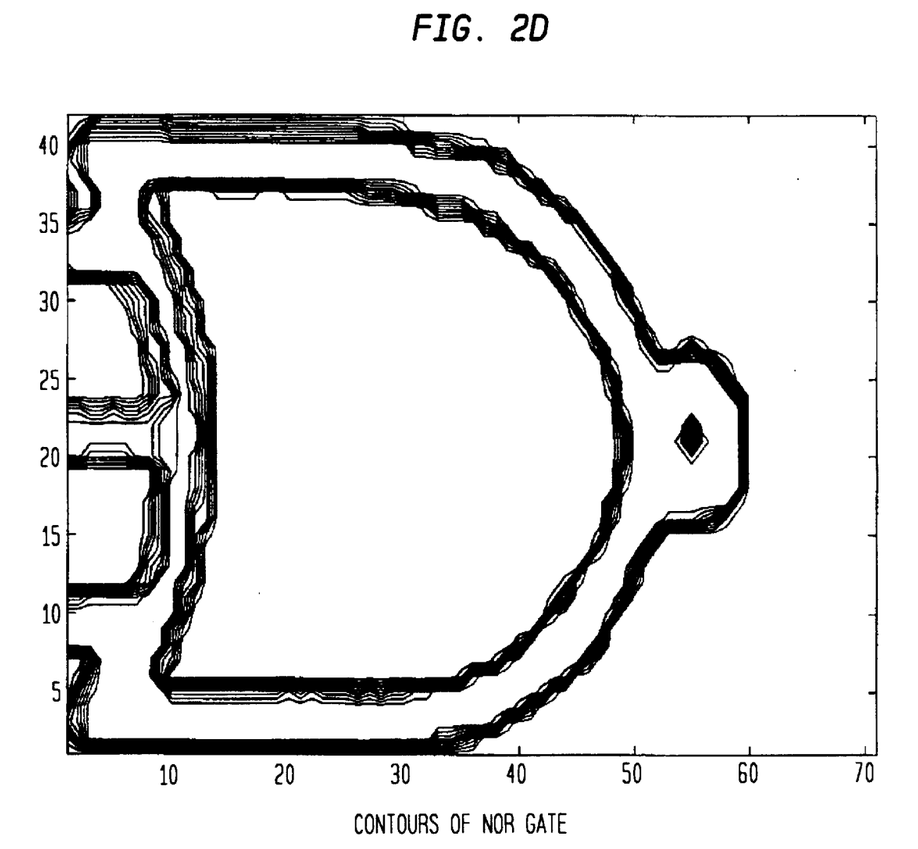
Figure 2E:
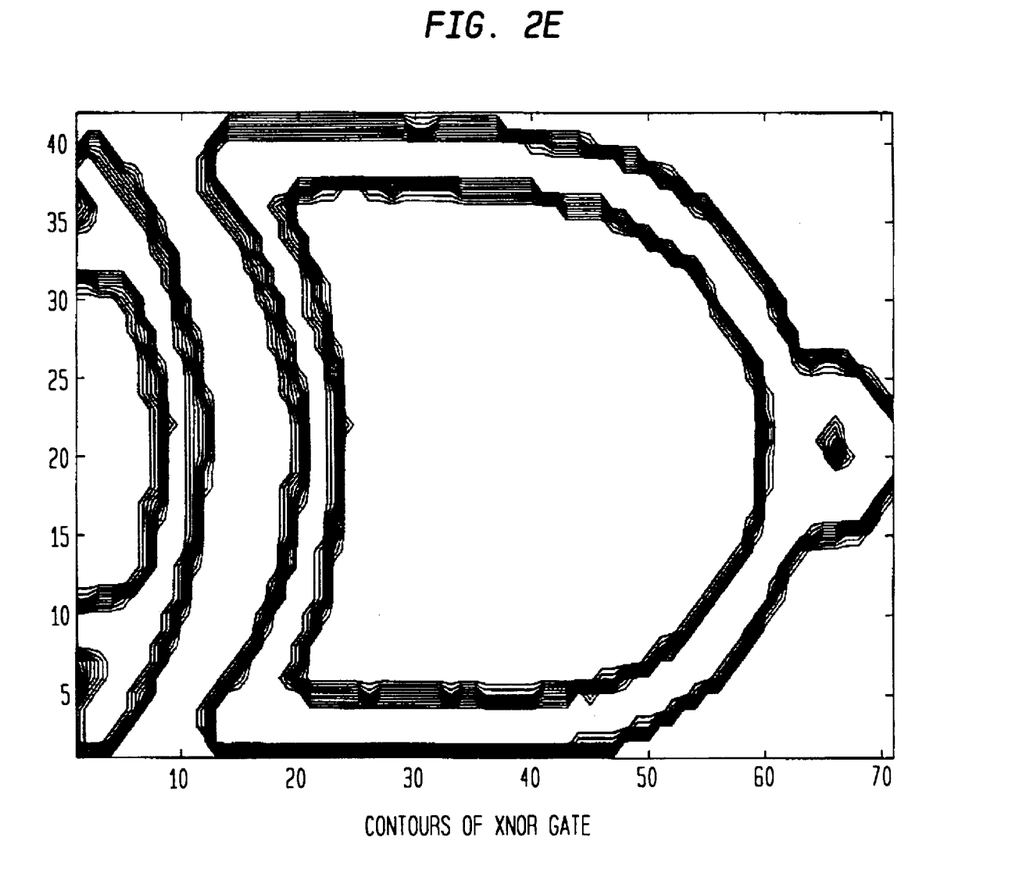

Now referring the drawings, FIG. 1 shows an example of a circuit which is to be scanned and processed according to the present invention. As can be readily seen, this drawing includes typical electronic circuit symbols, such as, AND, NAND, NOR, XNOR and INV (inverter) gates. These particular symbols will serve as an example for purposes of further describing the present invention.

Figure 6:
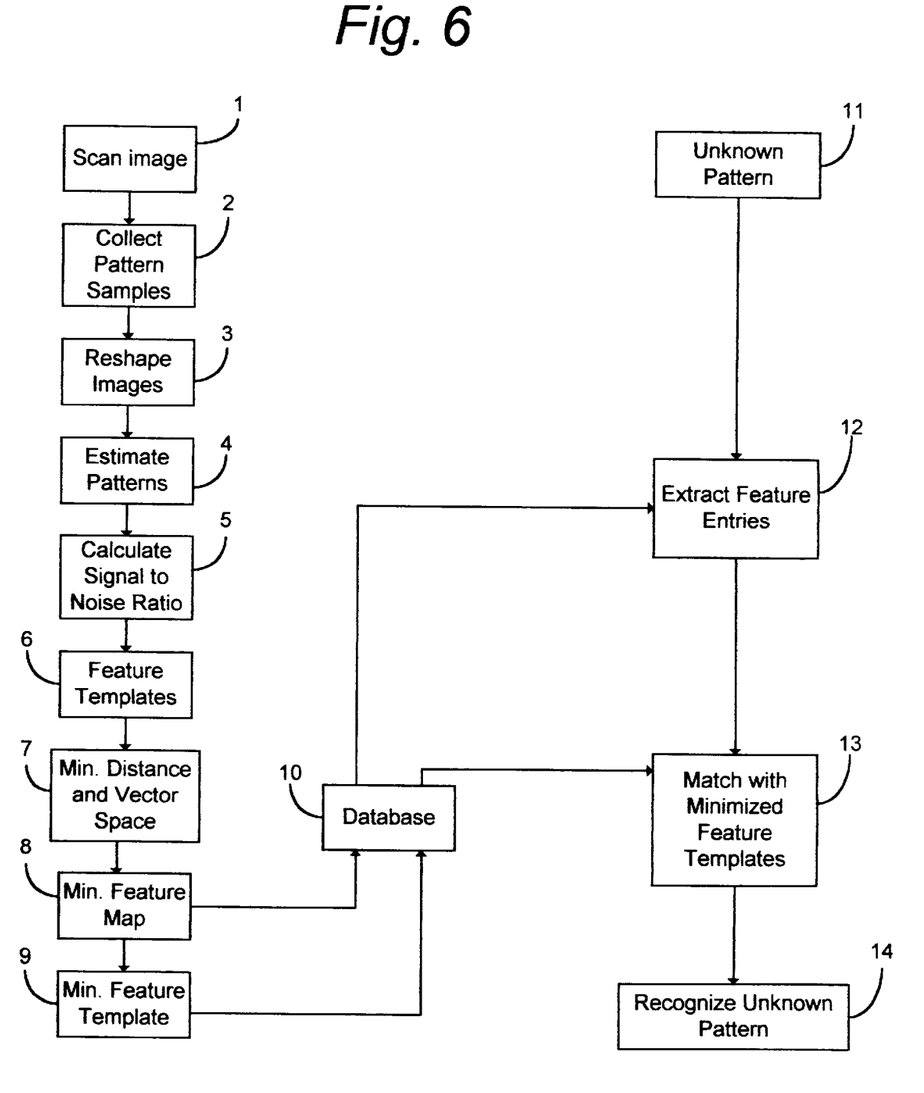
FIG. 6 is a flow chart diagram of the present invention.

Samples of these patterns for each of the gates and the inverter are scanned from the paper schematic with a resolution of 200 dpi. Assuming that the size of the pattern is 71×42, then there will be 2982 pixels. In FIG. 6, this is shown as the first step of the process, scanning image step 1.

The pattern samples are then collected and the images are reshaped to the same size. This is depicted as steps 2 and 3, respectively of FIG. 6. This typically can be done by probability contour maps as shown in FIGS. 2a–e. The probabilities $p_j$ are calculated and illustrated graphically as probability contours in FIGS. 2a–e for each of the gates set forth above, respectively. The pixels near or within the most-inner contour are most likely to be 'black' and therefore, they are assigned to '1's in $\hat{v}_{ij}$; the pixels lying near or outside the outermost contour are most likely to be 'white' and therefore, they are assigned to '0's in $\hat{v}_{ij}$; and the pixels around the middle contours are ambiguous or noisy and therefore, they are assigned as 'x's in $\hat{v}_{ij}$.

Then, estimates of the patterns are established, step 4 of FIG. 6. For example, assuming that $\epsilon=0.01$, the estimates of the patterns, as described in the Pattern Estimate step above and, illustrated as step 4, are obtained by finding $\hat{v}_{ij}$, with $i=\{1,2,\ldots,71\}$ and $j=\{1,2,\ldots,42\}$. A signal to noise ratio is calculated, step 5 of FIG. 6 and unnecessary pixels are eliminated leaving only the group of dominant pixels to be extracted, as described in the Elimination of Unnecessary Pixels step above and illustrated as step 4 of FIG. 6.

Figure 3:
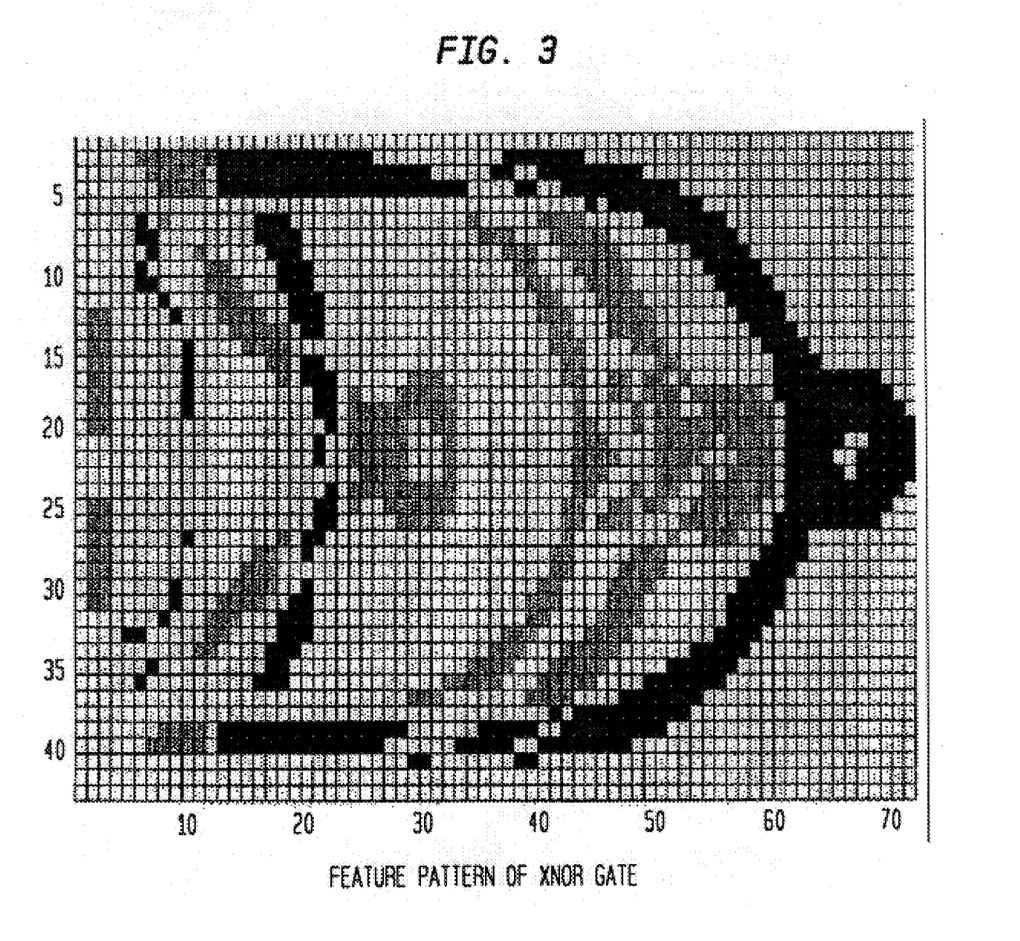
FIG. 3 is the feature pattern of a typical XNOR gate symbol used in electronic circuit drawings.

Next, the feature templates are created, step 6 of FIG. 6. For example, assuming that $\beta=1$ and using a XNOR gate, as shown in FIG. 3, there are 42×71 squares which represent 2982 pixels of an original image sample indexed from top to bottom, and left to right. In FIG. 3 white squares represent non-feature pixels indexed by the set V∪W∪P, black squares represent '1's and the grey squares represent '0's in the feature template, $f_{XNOR}$, or the XNOR gate. Thus, eliminating the non-feature pixels, the data complexity of this feature template is reduced to 28%, from 2982 pixels to 856 pixels, with a recognition confidence of 99%.

The minimized feature templates are then created, step 9 of FIG. 6, by first minimizing the distance and vector space, step 7 of FIG. 6, in the feature templates to create a feature map, step 8 of FIG. 6, as described in the Minimized Feature Template step described above.

Minimizing this feature template of a high dimension image often requires many calculations. Therefore, to simplify this stop, a sub-minimum algorithm is used in searching for $y_{AND}$, $y_{NAND}$, $y_{NOR}$, $y_{XNOR}$, and $y_{INV}$. This is a trial and error method that checks all pixels in order.

Figure 4:
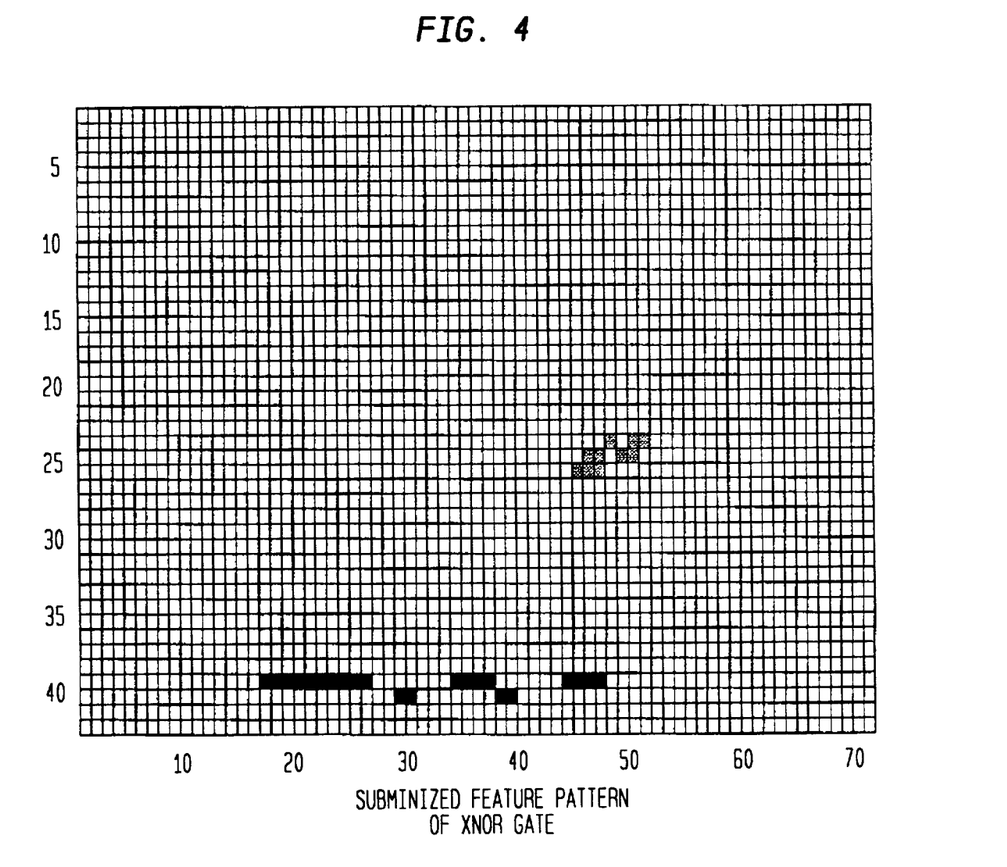
FIG. 4 is a sub-minimized feature pattern of the XNOR gate symbol of FIG. 3.

As is calculated from the example, the minimum distance between $f_{AND}$, $f_{NAND}$, $f_{NOR}$, $f_{XNOR}$, and $f_{INV}$ is 39 pixels. If the minimum distance, $d_{min}$, of this step 7 is set at 39, the 856-dimensional $f_j$s is reduced to a 130-dimensional $y_{AND}$, $y_{NAND}$, $y_{NOR}$, $y_{XNOR}$, and $y_{INV}$ with the sub-minimum algorithm. However, if the $d_{min}$ is selected to be 10, then the 856-dimensional $f_j$s is reduced to a 32-dimensional $y_j$s, which is graphically shown as 32 non-white squares in FIG. 4. Even using 10 as the minimum distance, then, it is clear that the various symbols can be catogorized into various minimum feature templates which can be stored in a database. Using 10 as the minimum distance and comparing the original image of 2982 pixels, only 32 of the pixels are needed in recognizing the symbols for AND, NAND, NOR, XNOR and INV and thus, the data complexity is reduced to 1% of the original image size.

The unknown image drawing patterns, block 11 of FIG. 6, are recognized by first extracting feature entries, step 12 of FIG. 6, from the database 10 which has had input from the minimized feature map. Then, from mapping the pattern images to 32-bit vectors and comparing them with the sub-minimized feature templates, step 13 of FIG. 6, the unknown patterns are recognized, step 14. This step is described in the Identification of Unknown Patterns step above.

Thus, the present invention in using the minimized feature template approach will enable those skilled in the art to recognized large image patterns by examining a minimum amount of pixels. Therefore, both processing time and memory space are significantly reduced and large sized images of drawing symbols, numerals and characters can be recognized efficiently and reliably.

Although the present invention has been described with regard to a specific embodiment as to reduce the number of pixels recognized in a scanned image, those skilled in the art will readily recognize that other variations of the presently described method are available. Accordingly, the inventors do not wish to be limited by the present specification, but only by the appended claims.

What is claimed is:

1. A method for processing scanned images comprising the steps of:

producing an image comprising a plurality of pixels;

generating a series of N patterns from the plurality of pixels by sampling groups of the plurality of pixels;

said generating step includes calculating the frequency of a pixel being a '1' after a particular pattern is sampled predetermined number of times $\eta_j$ where the frequency is calculated from a first expression:

$$p_j = \left(\sum_{k=1}^{\eta_j} v_j(k)\right) / \eta_j$$

extracting a plurality of dominant pixels from the series of N patterns;

generating a minimized feature template of each of the N patterns; and identifying each of the minimized feature templates of the N patterns.

2. The method of claim 1 where in said first expression of the generating step for each pattern $v_j$, $j \in P$, and $P=\{1, 2, \ldots N\}$, and $\eta_j$=samples of $v_j(1), v_j(2), \ldots v_j(\eta_j)$ and where for the pixels of a particular pattern $v_j(k)$, $k=1,2,\ldots \eta_j$, and are '0's or '1's.

3. The method of claim 2 further comprising including choosing the estimate of said particular pattern by a second expression:

$$v_{ij} = \begin{cases} 0 & 0 < p_{ij} < \varepsilon \\ 1 & \text{if } 1-\varepsilon < p_{ij} < 1 \\ x & \text{elsewhere} \end{cases}$$

where $v_j$ is an estimate of said particular pattern $v_j$; $v_j$ and $p_{ij}$ are the i-th pixel of said $v_j$ and $p_j$, respectively, 'x' is a large integer such that $x+N \neq x$, $i \in S$, $S=\{1,2,\ldots,M\}$, and M is the total number of pixels in one instance of said $v_j$.

4. The method of claim 1 wherein said step of extracting a plurality of dominant pixels is defined by a third expression:

$$b = \left(\sum_{j=1}^{N} v_j\right) / N$$

where $v_j$ is an estimate of a particular pattern $v_j$ and where the i-th entry of b, denoted by $b_i$, i ∈ S, has four possible values: 1) $b_i=0$, 2) $b_i=1$, 3) $0<b_i<1$, and 4) $b_i=(\alpha/N)x$, where $\alpha \in P$.

5. The method of claim 4 wherein said values 1) and 2) of said b indicate that the i-th pixels of $v_1, V_2,..., V_N$ do not play any role in separating patterns and the value 4) of said b indicates the noise level of the i-th pixel and wherein a set of pixel indices to be eliminated is defined in a fourth expression as:

$$i \in \begin{pmatrix} U & b_i = 0, 1 \\ W & b_i \geq \frac{\beta}{N}x \end{pmatrix}$$

where $\beta \in P$, and the set $U \cup W \subset S$ contains non-feature pixels having indices eliminated from a set S.

6. The method of claim 1 further comprising the step of generating a minimized feature template includes the step of extracting a plurality of dominant pixel indices from each of the minimized feature templates.

7. The method of claim 1 wherein the patterns are recognized after mapping an unidentified pattern z to a low dimension vector based on predetermined indices.

8. The method of claim 1 wherein the produced image is an image of an electronic circuit.

9. An apparatus for processing scanned images comprising:
means for producing an image comprising a plurality of pixels;
means for generating a series of N patterns from the plurality of pixels by sampling groups of the plurality of pixels;
said generating means further including a means for calculating the frequency of a pixel being a '1' after a particular pattern is sampled predetermined number of times $\eta_j$, where the frequency is calculated from a first expression:

$$p_j = \left(\sum_{k=1}^{\eta_j} v_j(k)\right) / \eta_j;$$

means for extracting a plurality of dominant pixels from the series of N patterns;
means for generating a minimized feature template of each of the N patterns; and
means for identifying each of the minimized feature templates of the N patterns.

10. The apparatus of claim 9 where in said first expression from the calculating means for each pattern $v_j$, j ∈ P, and P={1,2,...N}, and $\eta_j$=samples of $v_j(1), v_j(2), ... v_j(\eta_j)$, and where for the pixels of a particular pattern $v_j(k)$, k=1,2,...$\eta_j$, and are '0's or '1's.

11. The apparatus of claim 10 further comprising including a means for choosing the estimate of a pattern by a second expression:

$$v_{ij} = \begin{cases} 0 & 0 < p_{ij} < \varepsilon \\ 1 & \text{if } 1-\varepsilon < p_{ij} < 1 \\ x & \text{elsewhere} \end{cases}$$

where $v_j$ is an estimate of said particular pattern $v_j$; $v_j$ and $p_{ij}$ are the i-th pixel of said $v_j$ and $p_j$, respectively, 'x' is a large integer such that x+N≠x, i∈S, S={1,2,...,M}, and M is the total number of pixels in one instance of said $v_j$.

12. The apparatus of claim 9 wherein said means for extracting a plurality of dominant pixels determines which pixels to eliminate by a third expression:

$$b = \left(\sum_{j=1}^{N} v_j\right) / N$$

where $v_j$ is an estimate of a particular pattern $v_j$ and where the i-th entry of b, denoted by $b_i$, i ∈ S, has four possible values: 1) $b_i=0$, 2) $b_i=1$, 3) $0<b_i<1$, and 4) $b_i=(\alpha/N)x$, where $\alpha \in P$.

13. The apparatus of claim 12 wherein said values 1) and 2) of said b indicate that the i-th pixels of $v_1, v_2, ..., v_N$ do not play any role in separating patterns and the value 4) of said b indicates the noise level of the i-th pixel and wherein a set of pixel indices to be eliminated is defined by a fourth expression as:

$$i \in \begin{pmatrix} U & b_i = 0, 1 \\ W & b_i \geq \frac{\beta}{N}x \end{pmatrix}$$

where $\beta \in P$, and the set $U \cup W \subset S$ contains non-feature pixels having indices removed from a set S.

14. The apparatus of claim 9 wherein the minimized feature template includes a means for extracting a plurality of dominant pixel indices from each of the minimized feature templates.

15. The apparatus of claim 9 wherein the patterns are recognized after mapping an unidentified pattern z to a low dimension vector based on predetermined indices.

16. The apparatus of claim 9 wherein the produced image is an image of an electronic circuit.

17. The method of claim 1, wherein the produced image is an image represented by Boolean numbers.

18. The method of claim 1, further comprising employing said method in finite size Boolean data sequence pattern recognition.

19. The apparatus of claim 1, wherein the produced image is an image represented by Boolean numbers.

20. The apparatus of claim 1, further comprising employing said apparatus in finite size Boolean data sequence pattern recognition.

* * * * *

UNITED STATES PATENT AND TRADEMARK OFFICE
CERTIFICATE OF CORRECTION

PATENT NO. : 5,946,415
DATED : August 31, 1999
INVENTOR(S) : Wei Su and Gerald T. Michael It is certified that error appears in the above-identified patent and that said Letters Patent is hereby corrected as shown below:

Column 5,
Line 32, delete "VUWUP" and insert -- VUWUR --;

Column 6,
Line 63, delete "$x + N \neq x$" and insert -- $x + N \approx x$ --;

Column 8,
Line 12, delete "$x + N \neq x$" and insert -- $x + N \approx x$ --;

Signed and Sealed this

Twenty-second Day of March, 2005

JON W. DUDAS
*Director of the United States Patent and Trademark Office*